Aug. 27, 1968  P. G. VENABLE  3,398,674
SHIELDING FOR BALERS

Filed Dec. 9, 1966  3 Sheets-Sheet 1

INVENTOR
PHILLIP G. VENABLE

BY
Geo. J. Meuchenthaler ATT'Y
R D Godard AG'T

Aug. 27, 1968  P. G. VENABLE  3,398,674
SHIELDING FOR BALERS
Filed Dec. 9, 1966  3 Sheets-Sheet 2

INVENTOR
PHILLIP G. VENABLE
BY
ATT'Y
AG'T

INVENTOR
PHILLIP G. VENABLE

United States Patent Office

3,398,674
Patented Aug. 27, 1968

3,398,674
SHIELDING FOR BALERS
Phillip G. Venable, Orion, Ill., assignor to J. I. Case Company, Racine, Wis., a corporation of Wisconsin
Filed Dec. 9, 1966, Ser. No. 600,563
3 Claims. (Cl. 100—1)

ABSTRACT OF THE DISCLOSURE

A protective cover for a supporting member, with the cover pivotally mounted on the member for opening from either of two sides. A brace assembly is pivotally connected between the supporting member and the cover, and it can be positioned in an extended manner to hold the cover in an upwardly pivoted position on the support member. Lock means are included on the brace assembly for securing the brace members in extended position, and the brace assembly can be pivotally collapsed in either direction for pivoting the cover downwardly on the supporting member.

---

This invention relates to a cover or shield for the working parts of an agricultural machine and more particularly to a shield for the knotter mechanism on a baler. Safety shields have been used in the past on the majority of machines to protect operators from injury. Enclosures or shields are also used to contain working parts which, although not dangerous if exposed, may be harmed by the elements, environmental conditions or other objects.

Many of the working parts of agricultural machines are subject to dust, dirt, chaff, etc., and therefore, require a cover or shield to protect the operator from injury and also to protect the delicate parts from foreign material.

In the case of baling or harvesting machines, the machine is usually working with dry materials in a dusty atmosphere. The knotter mechanism, for instance, in a baler is a delicate device and one may say that the entire success of the baling operation is dependent on the certainty of tying every bale. This mechanism must be inspected and serviced at regular intervals and, since a cover or shield preferably encloses the mechanism, the shield should have certain features to make the inspection and maintenance as efficient as possible.

The main object of this invention is to provide a shield or cover for the working parts of a machine which parts require periodic inspection and service.

A further object is to provide a cover or shield for an agricultural machine which shield is easily moved for inspection and service of the machine.

Another object is to provide a cover or shield for an implement which shield can be moved in either of two directions.

Still a further object is to provide a protective shield for a baler which can be moved to either side for inspection and service of the working parts.

An additional object is to provide a means for bracing the cover or shield open from either direction.

Another object is to provide a brace assembly for a shield which assembly can be released from either of two directions.

Additional objects and advantages will become apparent from a reading of the following specification taken with the annexed drawings, in which.

Figure 1:
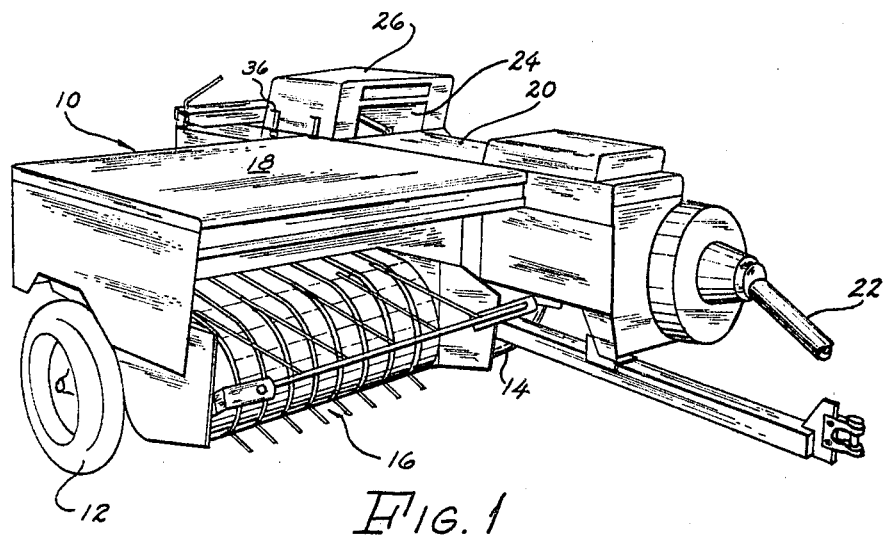
FIG. 1 is a perspective view of an agricultural machine embodying the present invention.

As seen in FIG. 1, there is shown a pickup baler including a frame, generally designated as 10, carried on ground engaging wheels 12 and 14, a pickup mechanism 16, a feeding chamber 18, a baling chamber 20, and baler drive means 22. The baler is adapted to be towed by a tractor which is not shown. An important part of the baling operation is the tying of the bales after they are formed in the baling chamber 20. The tying mechanism or knotter requires inspection and service or maintenance at periodic intervals and, of course, should be in a position for easy access. The knotter mechanism is therefore rearward of the plunger and feed chamber and also upward of these parts in an area shown as 24 in FIG. 1.

Because the knotter mechanism is considered so important in the baling operation and since the parts are relatively delicate in comparison to other parts, the mechanism should be protected from the elements and foreign material. The present invention provides a shield or cover 26 and means for opening the shield and holding it open while inspecting or servicing the knotter mechanism. The shield or cover as disclosed herein in includes a top portion 28 and side portions 30 and 32, as best shown in FIGS. 2, 3, 4, and 5. The present embodiment shows partially open front and rear portions so that the operation of the knotter can be observed while the baler is working. Of course, the front and rear portions may also be enclosed but this construction is not necessary to carry out the invention. Side portions 30 and 32 are substantially perpendicular to top portion 28 so that one of the sides remains secure and supports the shield in an open position.

Figure 2:
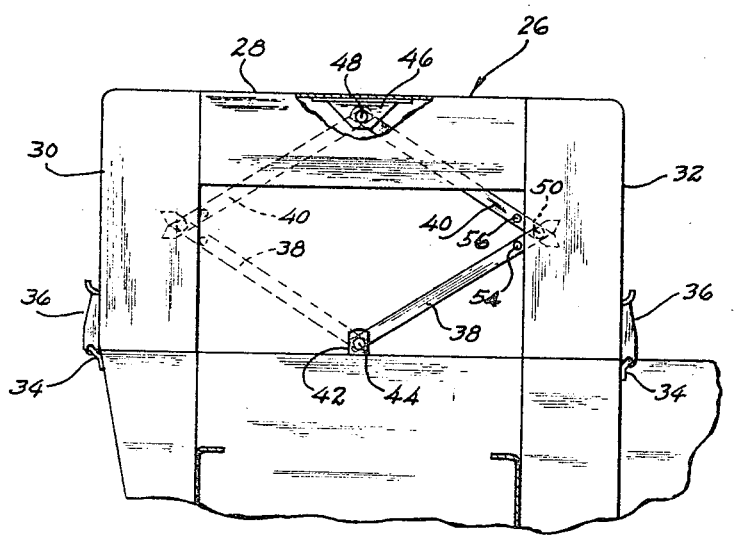
FIG. 2 is an elevational view of the protective shield in place.
Figure 4:
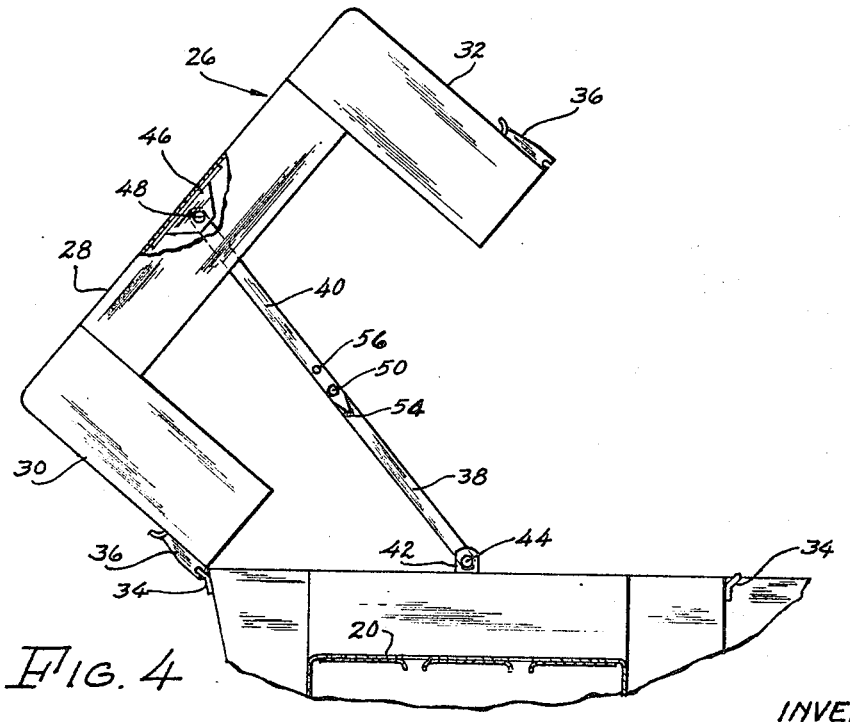
FIG. 4 is an elevational view of the shield in an open position to one side.
Figure 5:
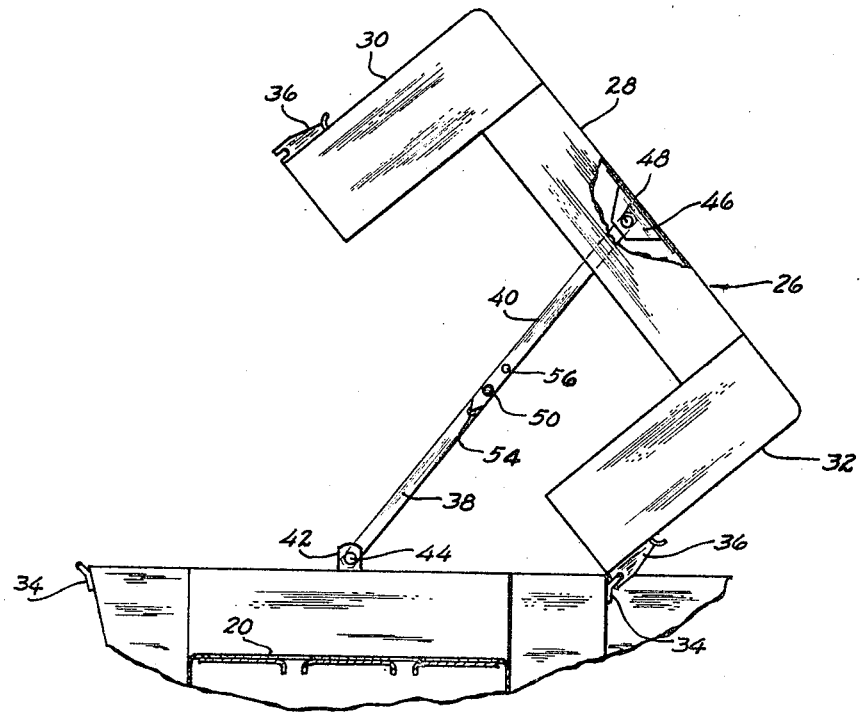
FIG. 5 is a similar view of the shield in an open position to the other side.

FIG. 2 shows the shield or cover 26 in place on the baler, the knotter mechanism not being shown as it forms no part of the present invention. FIGS. 4 and 5 show the shield in open position, FIG. 4 to the left position as viewed in the direction of travel, and FIG. 5 in the right position.

Figure 3:
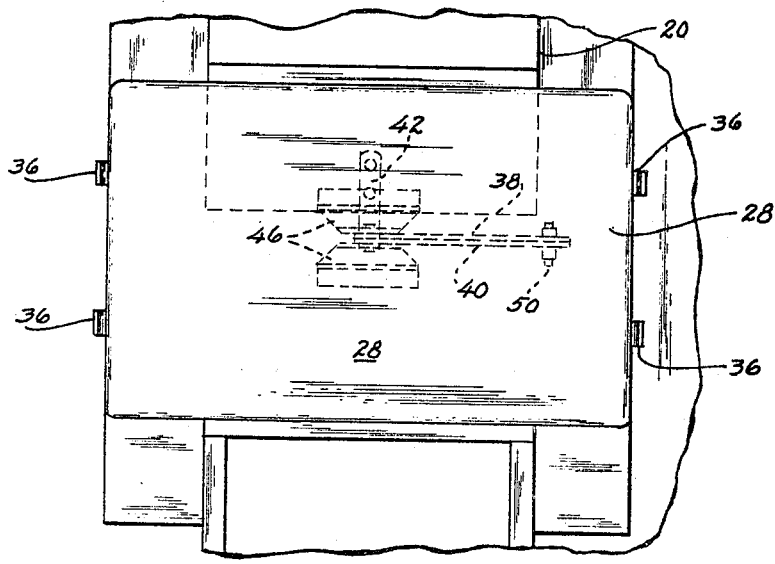
FIG. 3 is a plan view of the shield shown in FIG. 2.

The shield is secured to the top or frame of the baler by means of hooks 34 and clamps 36. Hooks 34 are preferably secured as by bolting to the top structure of the mechanism and in the present instance, there are four of these hooks, as shown in FIG. 3. Attached to shield 26 are four clamps 36 which mate with the hooks and hold the shield securely fastened in place when the shield is in the closed position.

It is thus seen that with the securing means as shown in FIGS. 4 and 5, the shield 26 can be opened from either the right or the left side of the machine. This is particularly important in the inspection and servicing of the knotter mechanism as the shield can be opened sufficiently from either side to fully expose the mechanism.

It is also equally important that the shield be braced or held in the open position during inspection or servicing. A brace assembly fulfills this purpose and obviates the need to find a place to set the shield and also simplifies the placing and aligning of the shield when replacing it over the knotter mechanism.

The means for holding the shield in the open position to either the right or left side is a brace assembly which includes members or braces 38 and 40. Member 38 is pivotally connected to the top or frame of the baler and member 40 is pivotally connected to the top portion of the shield. A lower support 42 is preferably bolted to the top of the baler and brace 38 is connected by a pin 44. Upper supports 46 are preferably welded to the underside of the center portion of the top portion 28 of the shield 26 and the brace 40 is connected to supports 46 by a pin 48.

Figure 6:
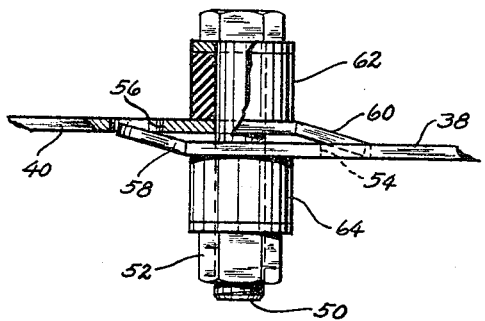
FIG. 6 is an enlarged view of the connection for the holding or bracing means.

Braces 38 and 40 are pivotally connected centrally between supports 42 and 46 by means of a bolt 50 and a nut 52 as seen in FIG. 6. Braces 38 and 40 define openings 54 and 56 near one end thereof and they also include portions 58 and 60 which are formed at a slight angle to the plane of the braces. The tips of portions 58 and 60 are narrowed to slip or slide into openings 56 and 54 a small amount such that when so engaged, members 38 and 40 are held in place to brace the shield in the open position.

To help retain the tip portions 58 and 60 in openings 56 and 54, resilient means or rubber bushings 62 and 64 are placed over the bolt 50, one bushing adjacent to brace 40 and the other adjacent to brace 38. These bushings provide a compression effect to secure the braces in a locked position until sufficient pressure from either side is applied to force the tips of the braces from the openings and the braces then pivot on bolt 50 and, in effect, collapse to the position shown in FIG. 2.

As seen in FIG. 2, the means for holding the shield are the members 38 and 40, so connected and attached to shield 26 and frame 10, that they may be moved either to the right as shown in solid lines or to the left as shown dotted. The pivot connections 44 and 48 always retain their relationship with the connection 48 vertically above the connection 44, even in the closed positions shown in FIG. 2.

When it is necessary to inspect or service the knotter mechanism, two of the clamps 36 on one side of shield 26 are unlatched from hooks 34, that side of the shield is lifted up and the brace assembly is either pushed or pulled from one of the positions shown in FIG. 2 to the position shown in FIG. 4 or 5, depending on which side is lifted. Members 38 and 40 provide a positive means of bracing the shield open from either direction. When it is desired to close the shield, a simple push or pull on the central portion of the brace assembly releases the tip portions of members 38 and 40 from openings 56 and 54 and the shield is then lowered into place and the clamps are made secure.

It is thus seen that herein shown and described is a shield for a knotter mechanism on a baler which can be opened and held open from either side. The intentions, objects and advantages of the invention are carried out and disclosed and the invention provides the desired results.

Variations in the above description will no doubt occur to those skilled in the art and it is to be understood that all such variations are contemplated as within the scope of the invention. The invention is not to be taken as limited by the embodiment disclosed, nor in fact, in any manner except as defined in the following claims.

What is new and desired to be secured by Letters Patent of the United States is:

1. In a protective cover for extending over a supporting member and including side portions and a top extending between said side portions, means operatively connected between each of said side portions and said supporting member for pivotally mounting said cover to said supporting member at each one of said side portions to pivot said cover upwardly off said supporting member at the opposite one of said side portions, a brace assembly connected between said cover and said member for upwardly supporting said cover when the latter is pivoted off said supporting member at either one of said side portions, the improvement comprising said brace assembly consisting of two brace members of equal length and pivotally connected together at first ends of said brace members and being extendable in a straight line and with said brace members being pivotal in the two directions toward both sides of the extended said brace members about their ends opposite said first ends, releasable lock means connecting said brace members together at said first ends for securing said brace members in said extended straight line and being responsive to forcing on said first ends for releasing said lock means to pivot said brace members in both directions about said opposite ends, and pivotal connection means between each of said opposite ends of said brace members and said supporting member and the central portion of said top of said cover, respectively, and with said pivotal connection means being located vertically one above the other in all pivoted positions of said cover such that said pivotal connection means do not move past each other in the extending and folding movements of said brace members for pivotally opening and closing of said cover on said supporting member.

2. The subject matter of claim 1, wherein said releasable lock means includes inter-engaging slip-type mating portions on said first ends of said brace members for securing said brace members disposed on said extended straight line and with said slip-type mating portions being arranged to be secured upon pivoting of said brace members from either side of said extended straight line, and with said releasable lock means including a resilient bushing compressed into operative connection with said first ends of said brace members for yieldingly positioning said mating portions into engaged position when said brace members are disposed on said extended straight line.

3. The subject matter of claim 2, wherein said first ends of said brace members are pivotally connected together with a bolt and a nut, said bolt being of a length greater than the combined width of said brace members to exend on opposite side of said brace members, and said resilient bushing being a rubber bushing on said bolt in position to be compressed by said bolt and nut and onto said brace assembly in accordance with the threaded position of said nut on said bolt.

References Cited

UNITED STATES PATENTS

| | | | |
|---|---|---|---|
| 1,497,125 | 6/1924 | Sorrells. | |
| 1,712,099 | 5/1929 | Wilson | 292—263 |
| 1,774,199 | 8/1930 | Good. | |
| 2,349,486 | 5/1944 | Crosman | 16—147 |
| 2,472,285 | 6/1949 | Claud-Mantle | 16—147 |
| 2,785,921 | 3/1957 | Barenyi | 16—147 XR |
| 3,008,177 | 11/1961 | Wooten | 16—147 |
| 3,069,541 | 12/1962 | Thomsen et al. | 16—147 XR |
| 3,259,936 | 7/1966 | Sheridan | 292—263 |
| 3,357,765 | 12/1967 | Molitor | 312—284 |

FOREIGN PATENTS

| | | |
|---|---|---|
| 1,113,235 | 11/1955 | France. |

BILLY J. WILHITE, *Primary Examiner.*